US009784301B2

(12) United States Patent
Gambardella

(10) Patent No.: US 9,784,301 B2
(45) Date of Patent: Oct. 10, 2017

(54) ASSEMBLY FOR PLUGGING AN APERTURE IN A BODY

(71) Applicant: United Technologies Corporation, Hartford, CT (US)

(72) Inventor: David E. Gambardella, East Haven, CT (US)

(73) Assignee: United Technologies Corporation, Farmington, CT (US)

( * ) Notice: Subject to any disclaimer, the term of this patent is extended or adjusted under 35 U.S.C. 154(b) by 53 days.

(21) Appl. No.: 14/679,649

(22) Filed: Apr. 6, 2015

(65) Prior Publication Data

US 2016/0123373 A1 May 5, 2016

Related U.S. Application Data

(60) Provisional application No. 62/074,968, filed on Nov. 4, 2014.

(51) Int. Cl.
F16B 21/00 (2006.01)
F16B 39/28 (2006.01)
F16B 39/24 (2006.01)
F16B 33/00 (2006.01)
F01D 11/00 (2006.01)
F01D 21/00 (2006.01)
F01D 25/24 (2006.01)

(52) U.S. Cl.
CPC ............ *F16B 39/28* (2013.01); *F01D 11/003* (2013.01); *F01D 11/005* (2013.01); *F01D 11/008* (2013.01); *F01D 21/003* (2013.01); *F01D 25/246* (2013.01); *F16B 33/004* (2013.01); *F16B 39/24* (2013.01)

(58) Field of Classification Search
CPC ........ F16B 21/00; F16B 21/02; F16B 21/125; F16B 33/004; F16B 21/28
USPC ......................... 411/347, 349, 383, 551, 552
See application file for complete search history.

(56) References Cited

U.S. PATENT DOCUMENTS

| | | | | |
|---|---|---|---|---|
| 1,306,100 A | * | 6/1919 | Chadwick | F16B 43/00 220/759 |
| 2,465,548 A | * | 3/1949 | Michael | B60R 13/105 411/166 |
| 3,171,182 A | * | 3/1965 | Danehy | F16B 21/02 411/349 |
| 3,664,434 A | * | 5/1972 | Connor | A01C 5/064 111/135 |
| 3,875,645 A | * | 4/1975 | Tucker | B23K 37/0408 269/49 |
| 4,406,530 A | | 9/1983 | Hasegawa et al. | |
| 4,470,735 A | | 9/1984 | Salisbury | |
| 4,825,642 A | | 5/1989 | Radtke | |
| 5,054,282 A | | 10/1991 | Costa et al. | |
| 5,095,617 A | | 3/1992 | Costa et al. | |

(Continued)

OTHER PUBLICATIONS

EP search report for EP15193027 dated May 3, 2016.

Primary Examiner — Roberta Delisle
(74) Attorney, Agent, or Firm — O'Shea Getz P.C.

(57) ABSTRACT

An apparatus includes a body, a collar, a fastener and a retainer. The body extends between first and second sides. The collar sealingly engages the first side and extends into an aperture in the body. The fastener engages the second side and extends through the collar to a distal end. The retainer is mated with the fastener at the distal end. The collar and the fastener cooperate to limit rotation therebetween.

20 Claims, 16 Drawing Sheets

(56) References Cited

U.S. PATENT DOCUMENTS

| | | | |
|---|---|---|---|
| 5,111,570 A | | 5/1992 | Baumgarten et al. |
| 5,370,488 A | * | 12/1994 | Sykes .................... F16B 21/02 |
| | | | 411/551 |
| 5,690,460 A | * | 11/1997 | Attanasio ................. F16B 5/10 |
| | | | 411/551 |
| 6,261,042 B1 | * | 7/2001 | Pratt ........................ F16B 5/10 |
| | | | 411/551 |
| 7,392,713 B2 | | 7/2008 | Barkhoudarian |
| 7,458,768 B2 | | 12/2008 | Dube et al. |
| RE43,928 E | | 1/2013 | Clouse et al. |
| 2005/0276677 A1 | * | 12/2005 | Andersson ............... B60R 9/04 |
| | | | 411/551 |
| 2012/0195746 A1 | | 8/2012 | Sarda |
| 2012/0204398 A1 | | 8/2012 | Herbold et al. |
| 2013/0259646 A1 | | 10/2013 | Feindel et al. |
| 2014/0093328 A1 | | 4/2014 | Tirone et al. |
| 2014/0093368 A1 | | 4/2014 | Scott et al. |

\* cited by examiner

ASSEMBLY FOR PLUGGING AN APERTURE IN A BODY

CROSS-REFERENCE TO RELATED APPLICATIONS

This application claims priority to U.S. Provisional Patent Application Ser. No. 62/074,968 filed Nov. 4, 2014, which is hereby incorporated herein by reference in its entirety.

BACKGROUND OF THE INVENTION

1. Technical Field

This disclosure relates generally to an assembly for plugging an aperture in a body such as an inspection port in a case of a turbine engine.

2. Background Information

Various apparatuses may include a plug for plugging an aperture in a body. A plug, for example, may be used to plug an inspection port in a turbine engine case. In another example, a plug may be used to plug a drain in a tank or other fluid vessel. While various plug types and configurations are known in the art, many are susceptible to leakage, have complex designs and/or require access to both sides of the body in order to secure the plug thereto.

There is a need in the art for an improved device/assembly for plugging an aperture in a body.

SUMMARY OF THE DISCLOSURE

According to an aspect of the invention, an apparatus is provided that includes a body, a collar, a fastener and a retainer. The body extends between first and second sides. The collar sealingly engages the first side and extends into an aperture in the body. The fastener engages the second side and extends through the collar to a distal end. The retainer is mated with the fastener at the distal end. The collar and the fastener cooperate to limit rotation therebetween.

According to another aspect of the invention, another apparatus is provided that includes a body, a collar, a fastener and a nut. The body extends between opposing first and second sides. The collar engages the first side and extends into an aperture in the body. The fastener includes a head and a shaft. The head is configured to pass through the aperture during a first step. The head is configured to engage the second side during a second step. The shaft is configured to extend through the collar to a distal end. The nut is threaded onto the shaft at the distal end.

According to still another aspect of the invention, an assembly is provided for plugging an aperture in a body. This assembly includes a collar, a fastener and a retainer. The collar includes a base and a protrusion. The base is configured to sealingly engage a first side of the body. The protrusion is configured to extend axially into the aperture. The fastener includes a head and a shaft. The head is configured to engage a second side of the body opposite the first side. The shaft is configured to extend axially away from the head, through the collar, to a distal end. The retainer is configured to mate with the shaft at the distal end. The head is configured to engage the protrusion and thereby limit rotation between the collar and the fastener.

The protrusion may be a first protrusion. The collar may include a second protrusion configured to extend axially into the aperture. The head may be configured to nest between the first and the second protrusions.

The collar, the fastener and the retainer may be configured to seal the aperture which has an elongated cross-sectional geometry.

A seal may be included and configured to extend around the protrusion and provide a seal interface between the base and the first side of the body.

The body and the collar may cooperate to limit rotation therebetween.

The collar, the fastener and the retainer may be operable to be assembled together with the body without having access to the second side of the body.

A head of the fastener may be configured to pass through the aperture where the head has a first orientation. The head may also be configured to engage the second side where the head has a second orientation.

The aperture may have a cross-sectional geometry. A head of the fastener engaging the second side may have a cross-sectional geometry sized and shaped to (i) fit within the cross-sectional geometry of the aperture in a first orientation and/or (ii) overlap the cross-sectional geometry of the aperture in a second orientation.

The aperture may have a cross-sectional geometry with a length and a width. A head of the fastener engaging the second side may have a cross-sectional geometry with a length greater than the width of the aperture and less than the length of the aperture.

The collar may include a first indicator. The fastener may include a second indicator. The first and the second indicators may be substantially aligned in the second orientation. The first and the second indicators may be misaligned in the first orientation.

The collar may include a protrusion. The fastener may include a head engaging the second side. The protrusion and the head may be configured to laterally engage one another and thereby limit rotation between the collar and the fastener.

The protrusion may include a planar surface that contacts a planar surface of the head and thereby limits rotation between the collar and the fastener.

The collar may include a second protrusion. The head may be positioned between the protrusion and the second protrusion.

The body and the protrusion may be configured to limit rotation between the body and the collar.

The body may include an aperture surface at least partially forming the aperture. The protrusion may include a surface that substantially conforms to the aperture surface and thereby limits rotation between the body and the collar.

The retainer may be a nut.

The aperture may extend along an axis through the body between the first and the second sides. The axis may be normal to the first side and/or the second side. Alternatively, the axis may be acute to the first side and/or the second side.

The body may be a component of a turbine engine.

A biasing member may be included and configured to bias a head of the fastener towards the collar.

The biasing member may be within a bore of the collar between a shelf of the collar and a shelf of the fastener.

The foregoing features and the operation of the invention will become more apparent in light of the following description and the accompanying drawings.

DETAILED DESCRIPTION OF THE INVENTION

Figure 1:
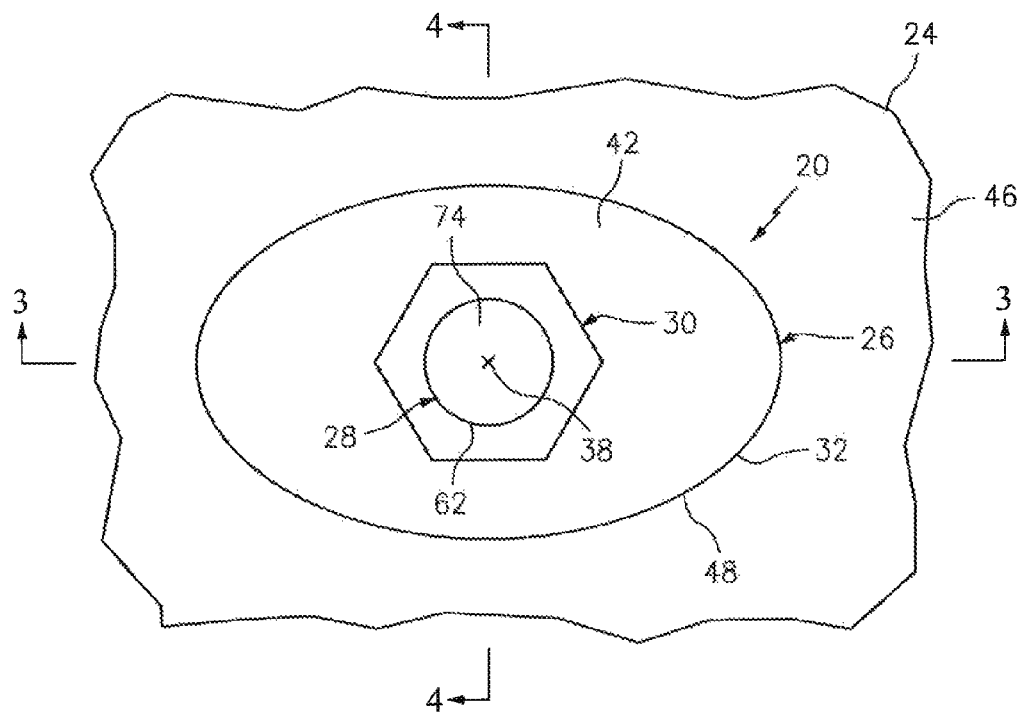
FIG. 1 is an illustration of an exterior side of a portion of a body configured with a plug assembly.
Figure 2:
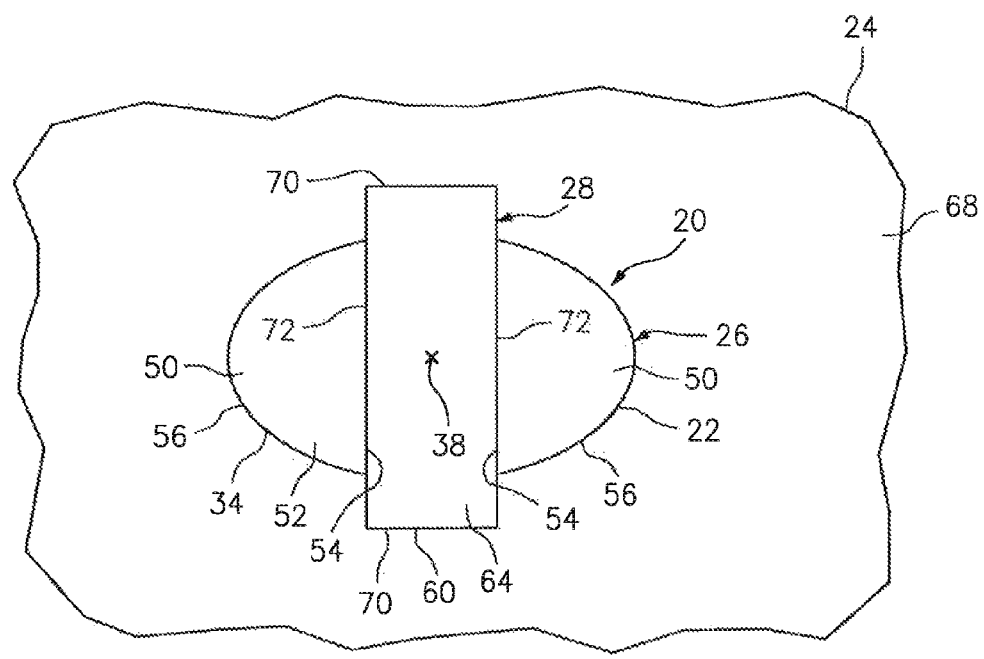
FIG. 2 is an illustration of an interior side of the body portion and the plug assembly of FIG. 1.

Various apparatuses may include a plug assembly for sealing, closing, covering and/or otherwise plugging an aperture in a body. A turbine engine, for example, may include a plug assembly for plugging an inspection port in a turbine engine case. A fluid vessel such as a liquid and/or gas tank may include a plug assembly for plugging a drain orifice.

Depending upon the particular apparatus configuration and/or state of assembly/disassembly, a technician installing and/or removing the plug assembly may have access to only one side of the apertured body; e.g., an exterior and/or radial outer side of the turbine engine case or fluid vessel. To accommodate such limited access situations, embodiments of a plug assembly are disclosed below which can be installed in and/or removed from an aperture in a body by a technician who may have limited or no access to one side of the body; e.g., an interior and/or radial inner side of a turbine engine case or pressure vessel. Of course, the plug assembly of the present disclosure is not limited to being utilized in such limited access situations.

FIGS. 1-4 illustrate an exemplary embodiment of a plug assembly 20 removably installed to plug (e.g., cover and seal) an elongated (e.g., oval or elliptical) aperture 22 in a body 24. For ease of description, the body 24 is described below as a turbine engine case and the aperture 22 is descripted as an inspection port. The present disclosure, however, is not limited to any particular plug application and/or body configurations. For example, the body 24 may alternatively be a fluid tank or any other object that can utilize the plug assembly 20 to plug an aperture therein.

The plug assembly 20 of FIGS. 1-4 includes a collar 26, a fastener 28 and a retainer 30. The collar 26 may be formed (e.g., cast, forged, machined and/or additively manufactured) as a unitary body. The collar 26 includes a base 32 and a lock insert 34. A bore 36 extends through the collar 26 along an axis 38, thereby providing at least the base 32 with an annular configuration. The bore 36 may be at least partially formed by an inner side surface 40 with a circular cross-sectional geometry.

The base 32 extends axially between a first end surface 42 and a second end surface 44, which is configured to axially sealingly engage a first side 46 of the body 24. The base 32 extends laterally (e.g., radially) between the inner side surface 40 and an outer side surface 48. The outer side surface 48 and, thus, an outer periphery of the base 32 may have an elongated cross-sectional geometry. This elongated cross-sectional geometry may be curved; e.g., oval or elliptical as shown in FIG. 1. Alternatively, the elongated cross-sectional geometry may be generally polygonal; e.g., rectangular. The present disclosure, however, is not limited to the foregoing exemplary base configurations. In other embodiments, for example, the outer side surface 48 may have a circular, square or generally amorphous cross-sectional geometry.

The lock insert 34 is configured to limit or prevent rotation of the fastener 28 about the axis 38. The lock insert 34 is also configured to limit or prevent rotation of the collar 26 about the axis 38. The lock insert 34 of FIGS. 2 and 3, for example, includes one or more (e.g., a pair) of protrusions 50 configured to project axially through the aperture 22. These protrusions 50 are arranged on opposing sides of the bore 36. Each of the protrusions 50 extends axially from the second end surface 44 to a distal end 52 of the lock insert 34. Each of the protrusions 50 extends laterally between an inner side surface 54 and an outer side surface 56. The inner side surface 54 may be substantially aligned with a portion of the inner side surface 40 and face the other protrusion 50. This inner side surface 54 may be substantially planar and flat and configured to laterally engage the fastener 28. The outer side surface 56 faces away from the other protrusion 50 and is configured to laterally engage an aperture surface 58 of the body 24 forming the aperture 22. The outer side surface 56 may have a cross-sectional geometry generally sized and shaped to conform to an end (e.g., major axis) portion of the aperture surface 58. The outer side surface 56, for example, may have a parti-oval or a parti-elliptical cross-sectional geometry. The present disclosure, however, is not limited to the foregoing exemplary lock insert configurations.

Figure 4:
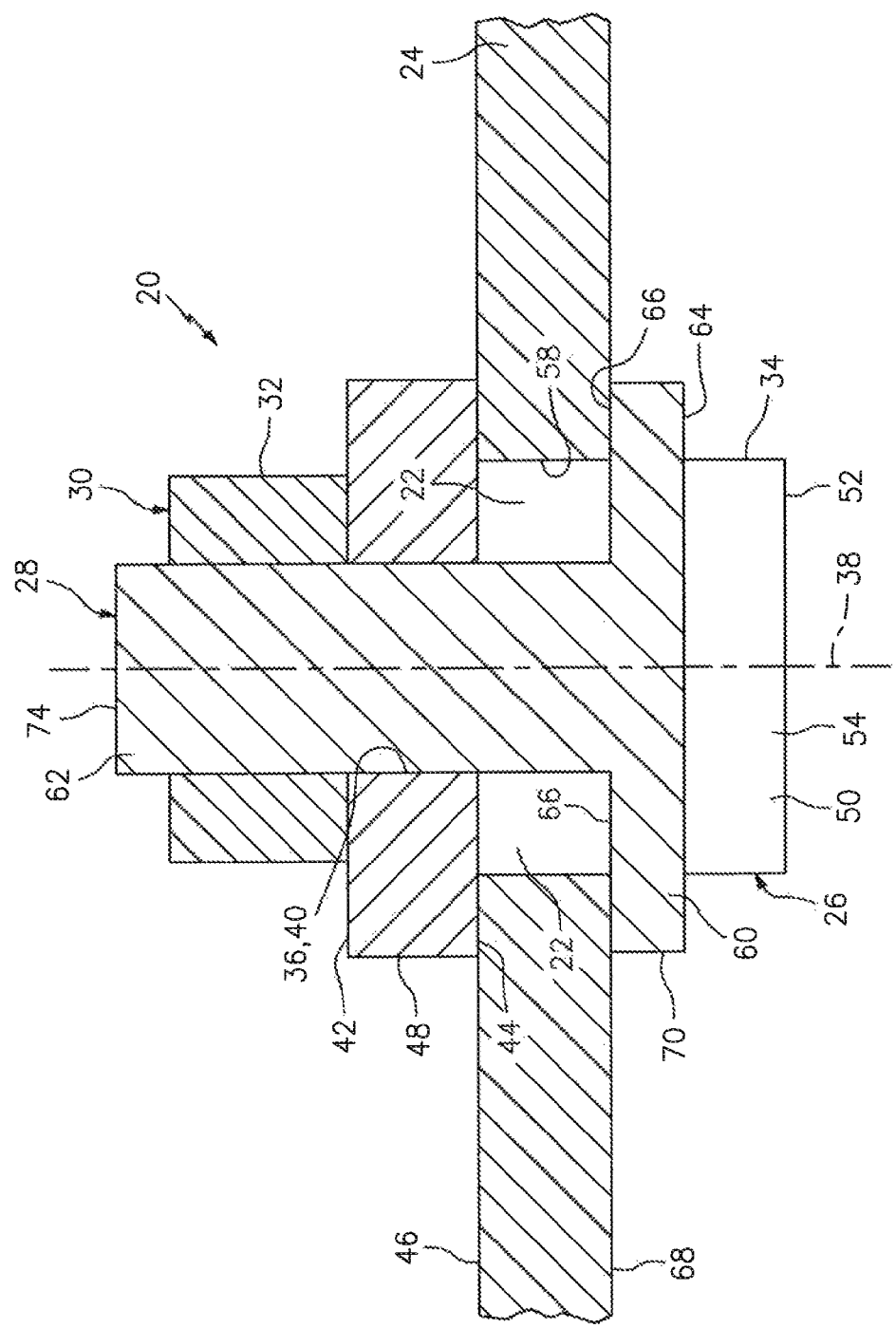
FIG. 4 is a sectional illustration of the body portion and plug assembly along line 4-4 in FIG. 1.

The fastener 28 may be formed as a unitary body; e.g., a T-stud. The fastener 28 includes a head 60 and a shaft 62. The head 60 extends axially between a first end surface 64 and a second end surface 66, which may be a segmented surface as illustrated in FIG. 4. This second end surface 66 is configured to axially engage a second side 68 of the body 24 that is opposite the first side 46 of the body 24; e.g., the aperture 22 extends through the body 24 between the sides 46 and 68. The head 60 extends laterally out to one or more side surfaces 70 and 72 (see FIG. 2), which form an outer periphery of the head 60. At least (e.g., intermediate) portions of the side surface 72 may be substantially planar and flat and configured to respectively laterally engage the inner side surfaces 54. The outer periphery may have an elongated cross-sectional geometry. This elongated cross-sectional geometry may be generally polygonal; e.g., rectangular.

Alternatively, the elongated cross-sectional geometry may be curved; e.g., oval or elliptical. The present disclosure, however, is not limited to the foregoing exemplary head configurations.

The shaft 62 is configured to project axially through the collar 26 to a distal end 74. More particularly, the shaft 62 extends axially from the second end surface 66 to the distal end 74 of the fastener 28. The shaft 62 may have a circular cross-sectional geometry. At least an end portion of the shaft 62 at (e.g., on, adjacent or proximate) the distal end 74 may be threaded and configured to mate with the retainer 30.

The retainer 30 may be configured as a nut. The present disclosure, however, is not limited to any particular retainer configurations. For example, in alternative embodiments, the retainer 30 may be configured as a pin or a clip.

Figure 5:
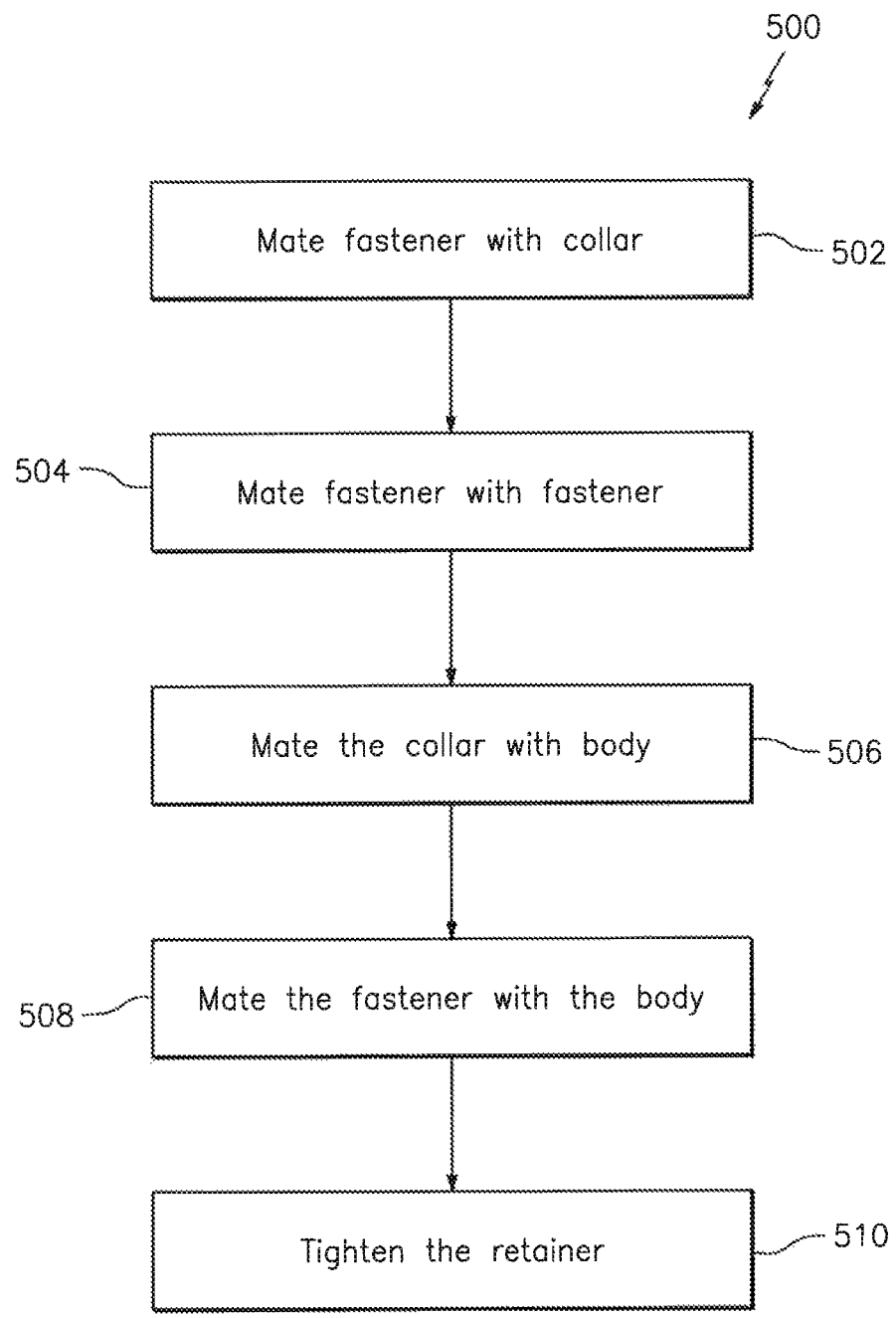
FIG. 5 is a flow diagram of a method for installing a plug assembly with a body.
Figure 6:
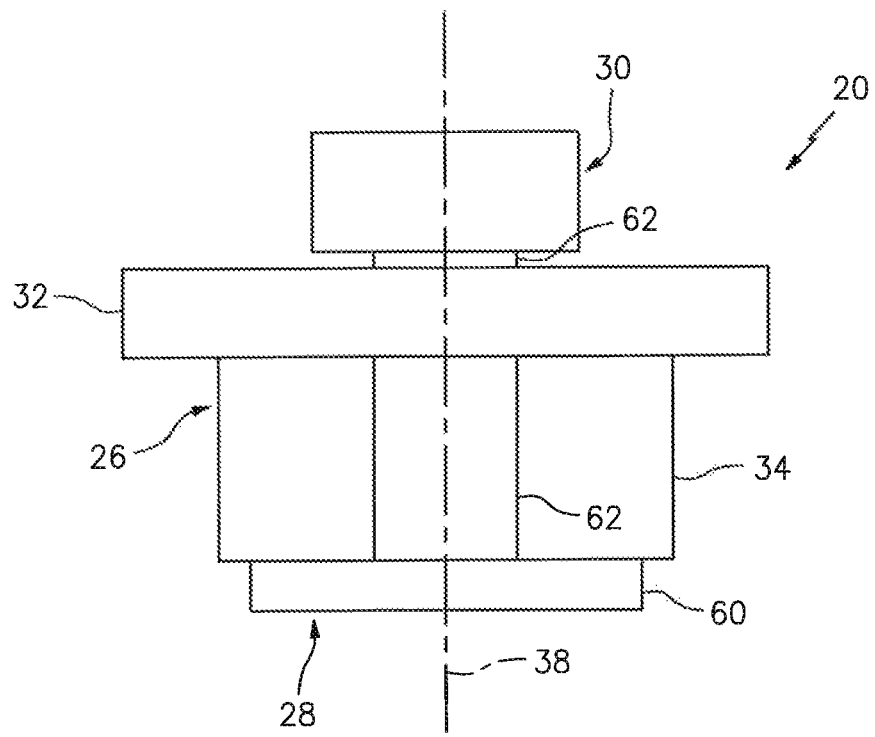
FIG. 6 is a side illustration of a plug assembly during a step of assembly.
Figure 7:
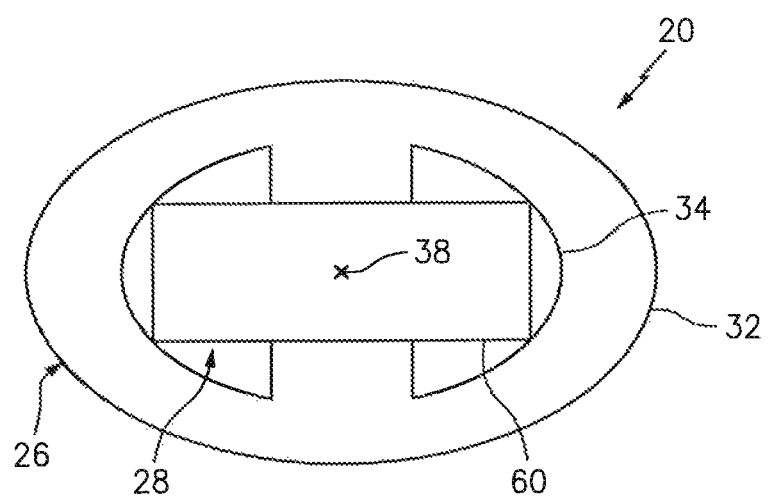
FIG. 7 is an illustration of an end of the plug assembly of FIG. 6.

FIG. 5 is a flow diagram of a method 500 for installing the plug assembly 20 with the body 24. In step 502, the fastener 28 is mated with the collar 26 as illustrated in FIGS. 6 and 7. For example, the shaft 62 is inserted into the bore 36 (see FIGS. 3 and 4). The head 60 is positioned next to the lock insert 34. The head 60 is rotationally positioned (e.g., clocked) in an orientation where its major axis is substantially aligned with a major axis of the lock insert 34 and the base 32. With this orientation, the cross-sectional geometry of the head 60 fits within an overall cross-sectional geometry of the lock insert 34 and, thus, the aperture 22 (see FIG. 2). More particularly the lock insert 34 generally laterally overlaps the head 60.

In step 504, the retainer 30 (e.g., nut) is mated to the end portion of the shaft 62 (see FIG. 6). In this step, however, the retainer 30 is not tightened so as to allow for play between the fastener 28 and the collar 26.

Figure 8:
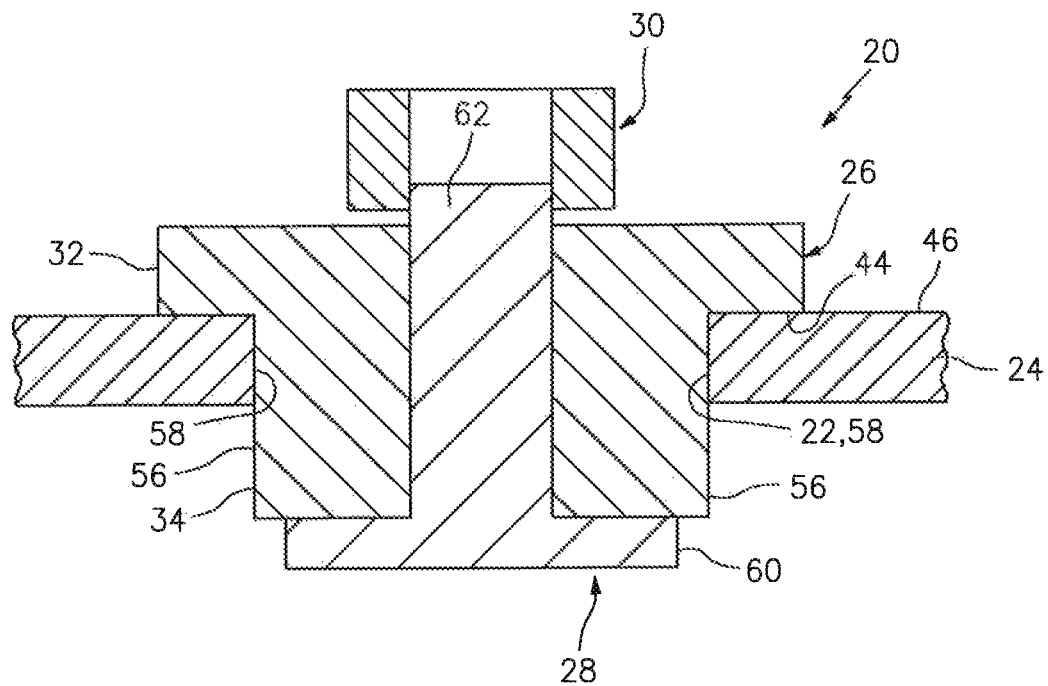
FIG. 8 is a sectional illustration of a portion of a body and a plug assembly during another step of assembly.
Figure 9:
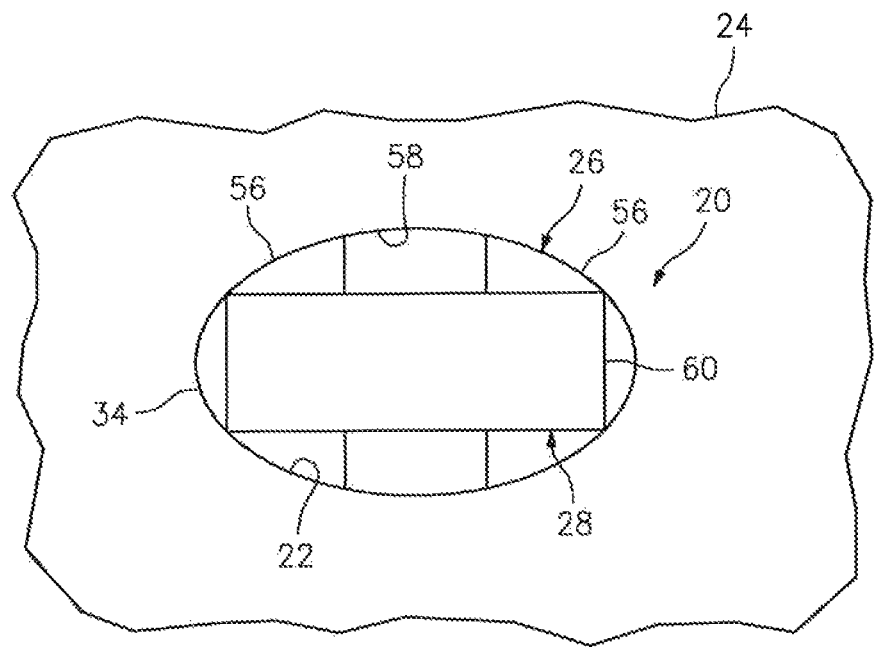
FIG. 9 is an illustration of an interior side of the body portion and the plug assembly of FIG. 8.

In step 506, the collar 26 is mated with the body 24. The head 60 and the lock insert 34, for example, are inserted into the aperture 22 as illustrated in FIGS. 8 and 9. The outer side surfaces 56 are next to and may laterally engage the aperture surface 58. With this configuration, the lock insert 34 may cooperate with the body 24 so as to prevent or limit rotation between the collar 26 and the body 24. In addition, the second end surface 44 is abutted against the first side 46 of the body 24.

In step 508, the fastener 28 is mated with the body 24. The head 60 is rotationally positioned (e.g., clocked) in another orientation where its major axis is substantially aligned with a minor axis of the lock insert 34 and the base 32 (see FIGS. 2-4). With this orientation, the cross-sectional geometry of the head 60 laterally overlaps the overall cross-sectional geometry of the lock insert 34 as well as the aperture 22. The head 60 is also nested between the protrusions 50 such that the surfaces 72 are next to and/or laterally engage the inner side surfaces 54. With this configuration, the head 60 and the lock insert 34 may cooperate with one another to as to prevent or limit rotation between the fastener 28 and the collar 26. In addition, the second end surface 66 is abutted against the second side 68 of the body 24.

In step 510, the retainer 30 is tightened so as to apply an axial clamping force on the body 24 between the base 32 and the head 60 (see FIG. 4). This clamping force may ensure the base 32 forms a seal with the body 24. The retainer 30 may similarly seal a gap between the shaft 62 and the base 32.

In some embodiments, the steps 504 and 510 may be combined into a single step performed after the step 508. Alternatively, the retainer 30 may be (e.g., slightly) tightened during the step 504 so as to prevent movement between the head 60 and the lock insert 34 during and previous to the step 506. The retainer 30 may then be slightly backed off before the step 508. The present disclosure, of course, is not limited to any particular assembly steps and/or assembly sequences.

Figure 3:
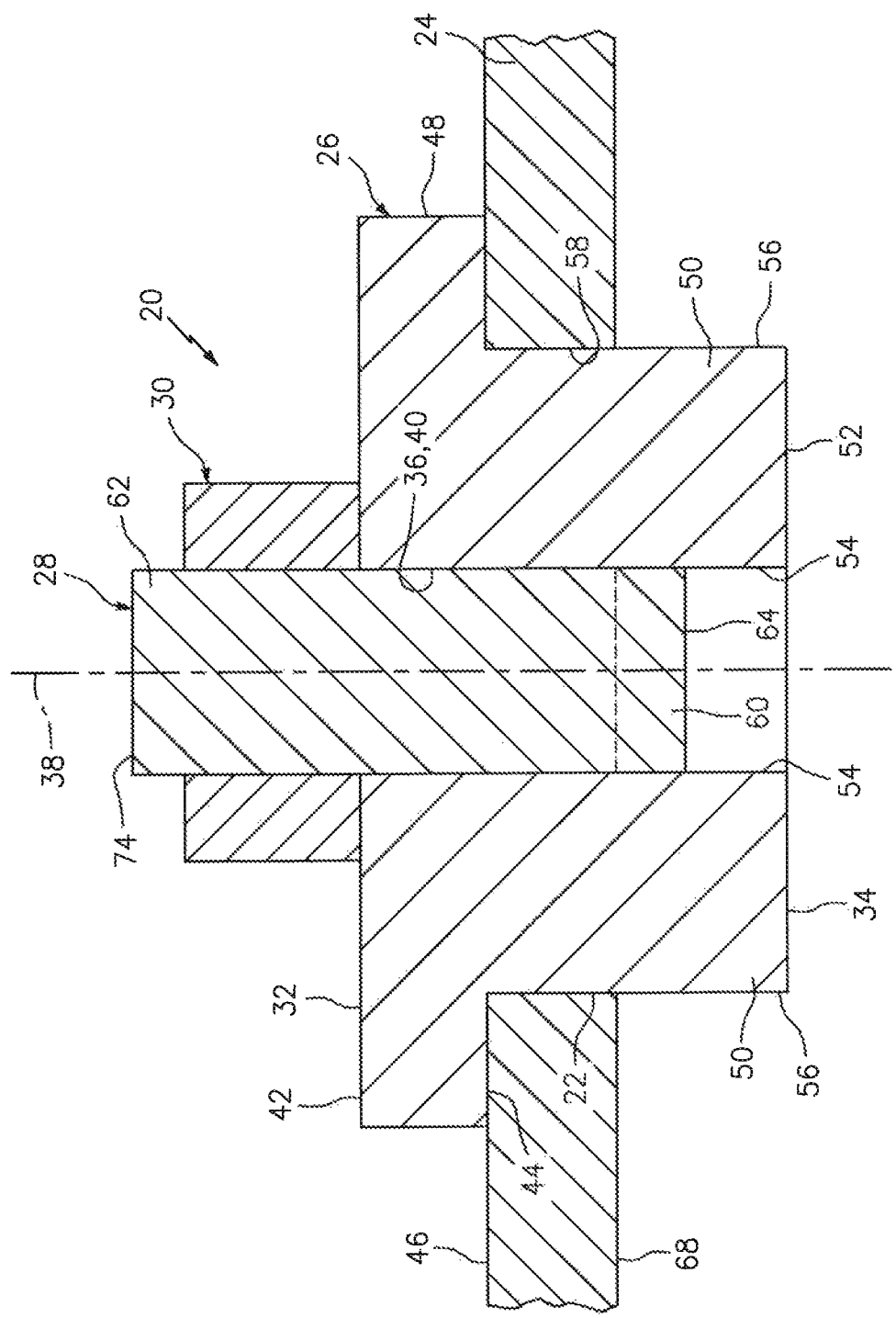
FIG. 3 is a sectional illustration of the body portion and plug assembly along line 3-3 in FIG. 1.
Figure 10:
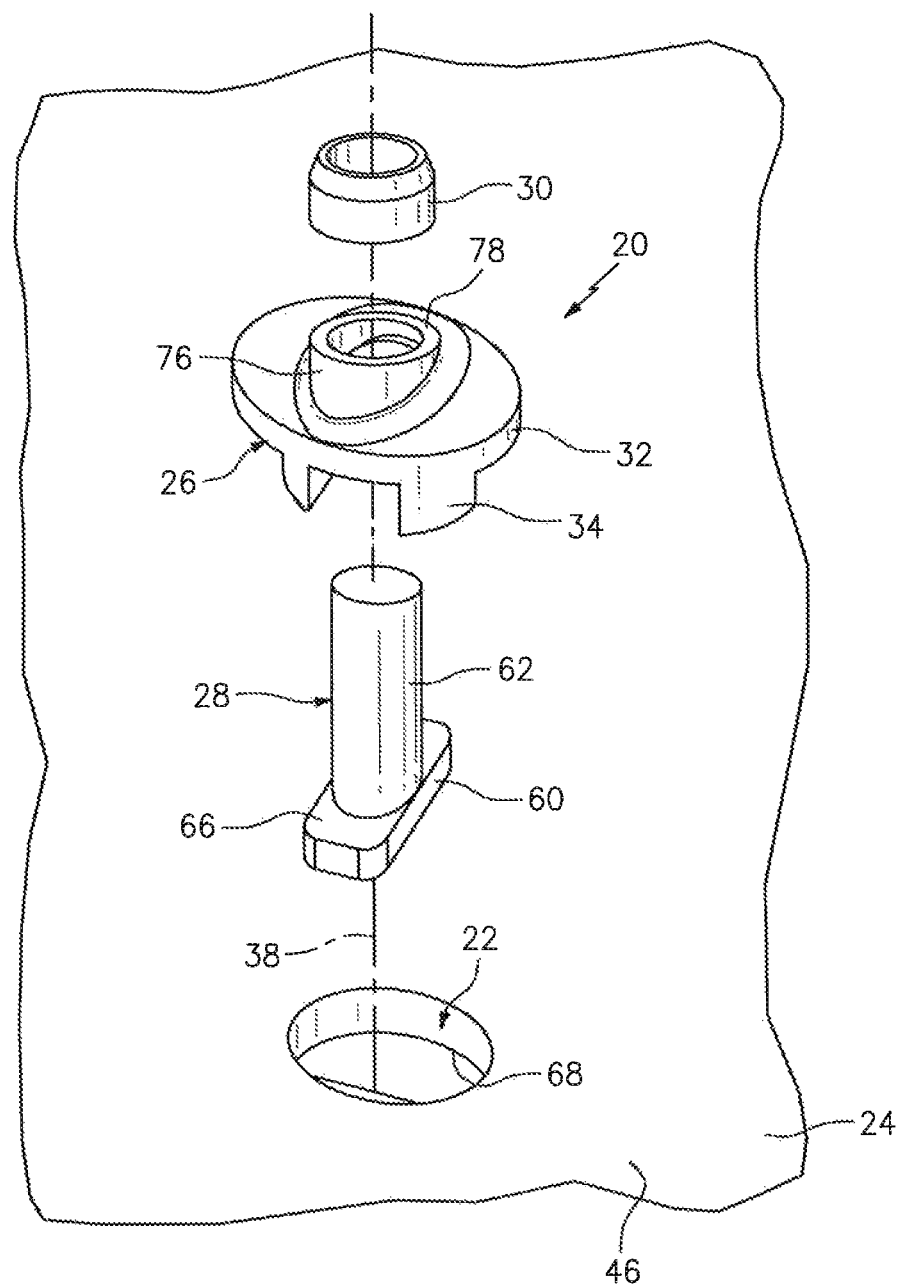
FIGS. 10-12 are exploded perspective illustrations of a portion of a body and an alternative embodiment plug assembly.
Figure 11:
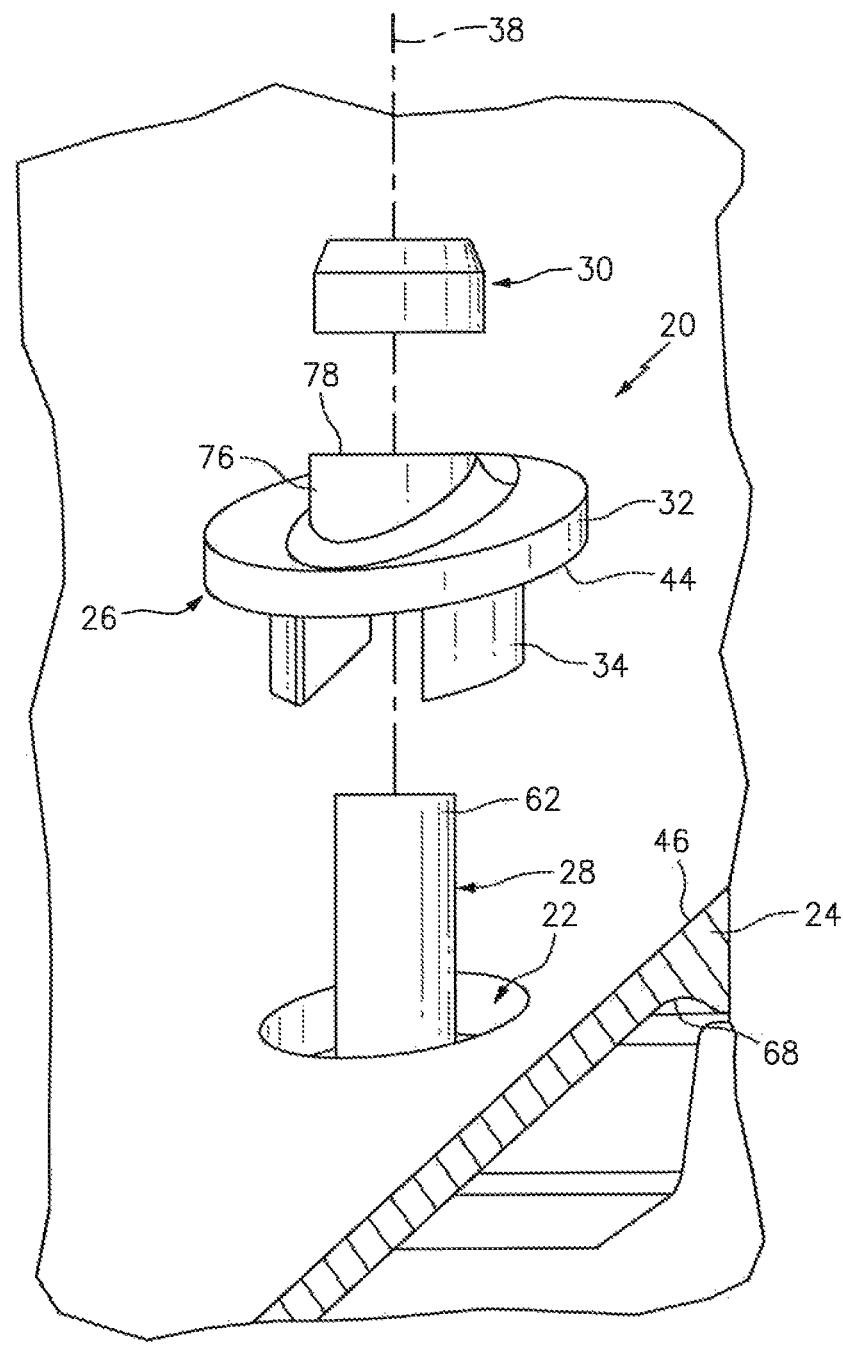
Figure 12:
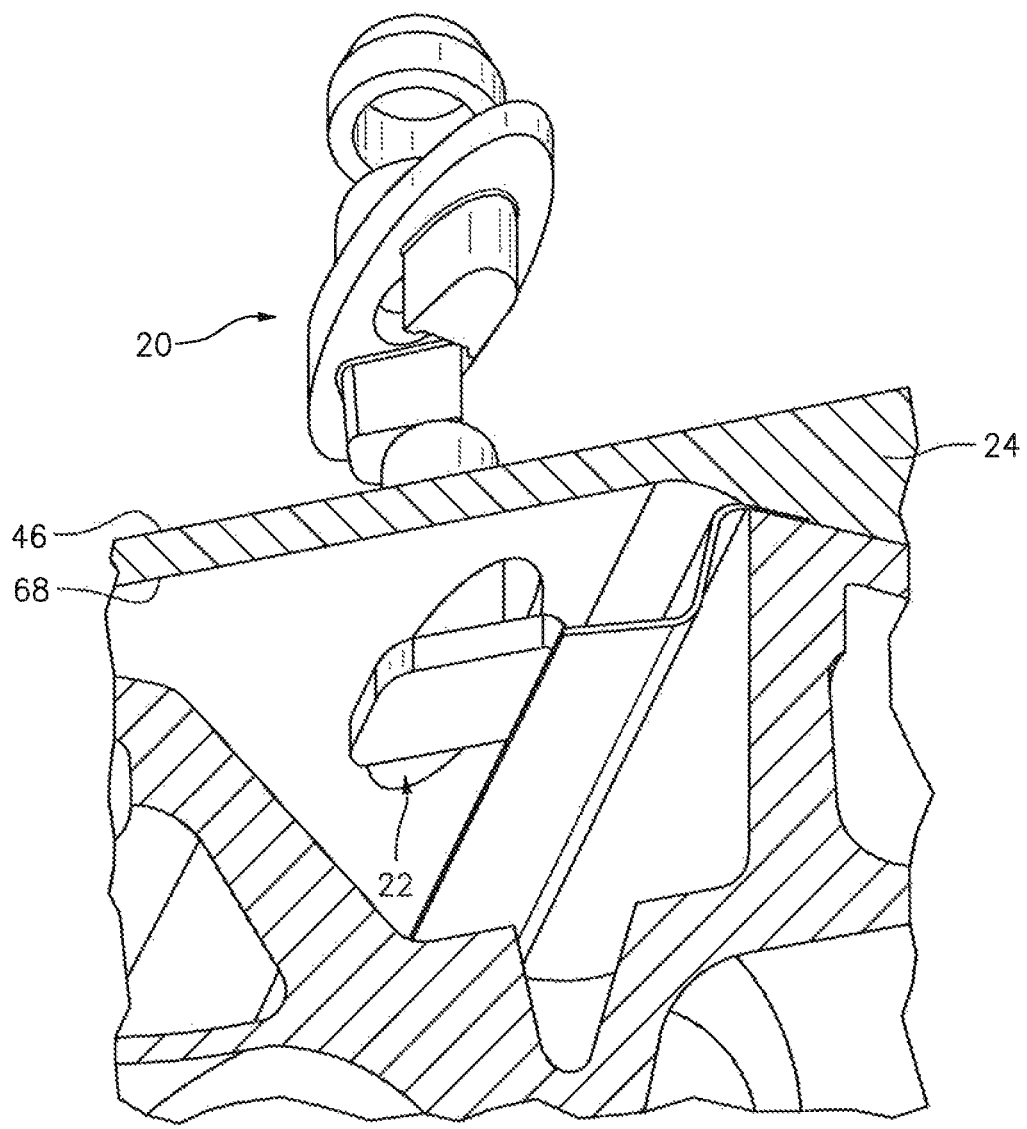

In some embodiments, referring to FIGS. 3 and 4, the axis 38 and, thus, the aperture 22 may be substantially normal (i.e., perpendicular) to the first and/or the second sides 46, 68 of the body 24. In other embodiments, as illustrated in FIGS. 10-12, the axis 38 and, thus, the aperture 22 may be acute (i.e., angled between zero and ninety degrees) to the first and/or the second sides 46, 68 of the body 24. In such embodiments, the head 60 may be configured acute to the shaft 62 such that the second end surface 66 lies substantially flat against the second side 68 of the body 24. In addition or alternatively, the base 32 may be configured acute to the lock insert 34 such that the second end surface 44 lies substantially flat against, the first side 46 of the body 24. The base 32 may also include an annular boss 76 with a distal end surface 78 that is substantially normal to the axis 38. The distal end surface 78 thereby may enable the retainer 30 to lie substantially flat against the base 32 when tightened on the fastener 28.

Figure 13:
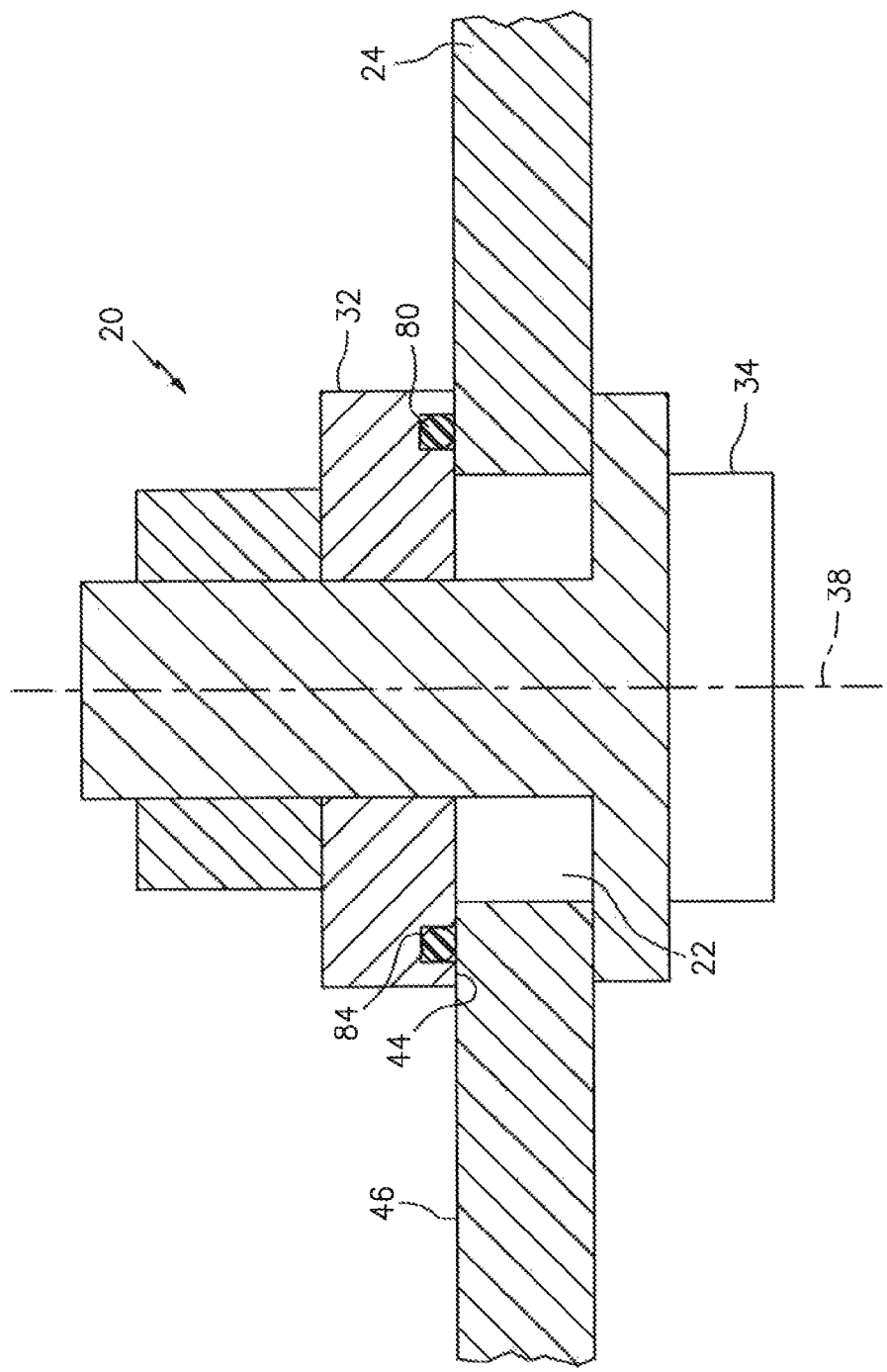
FIGS. 13 and 14 are sectional illustrations of respective alternative embodiment plug assemblies.
Figure 14:
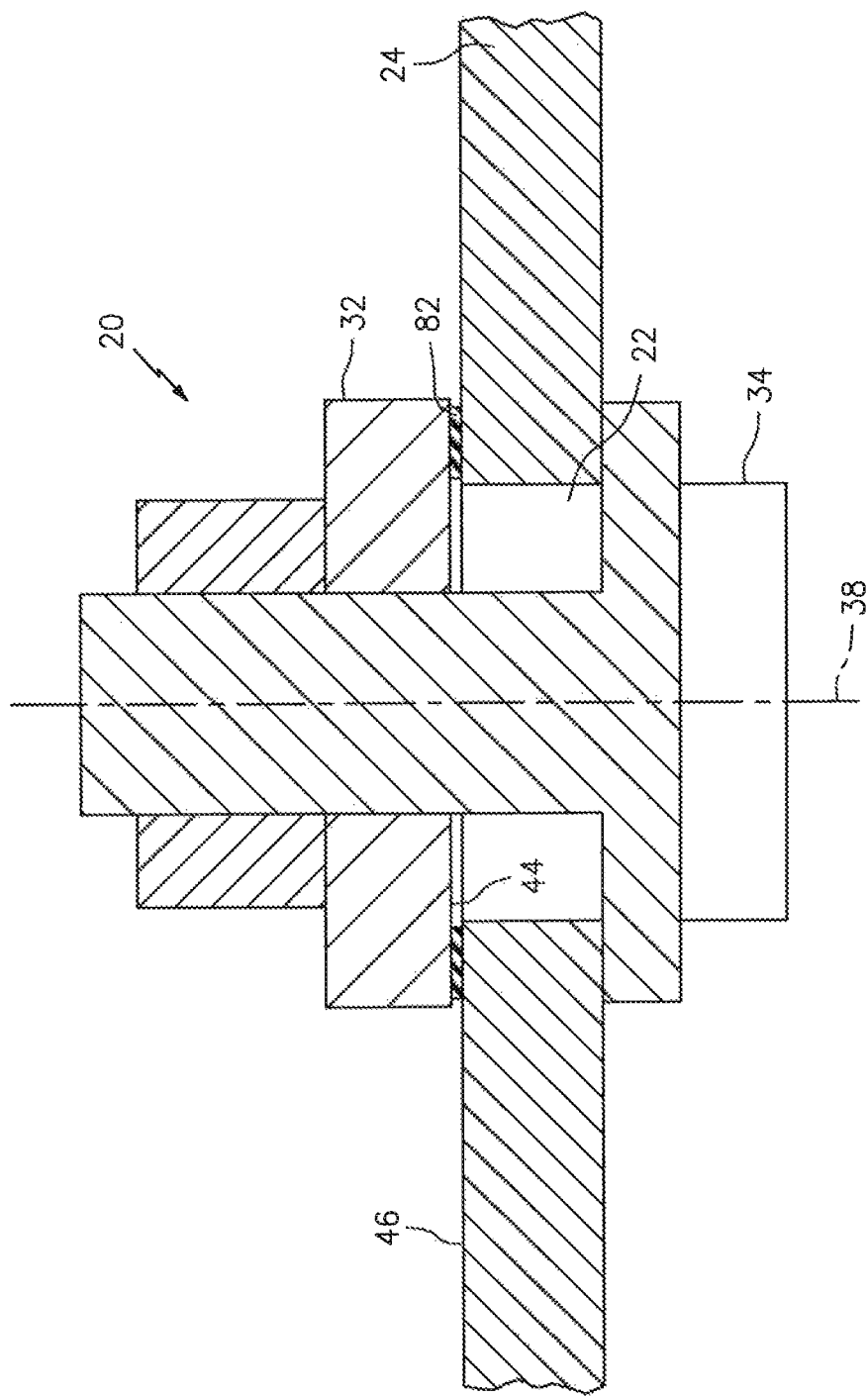

In some embodiments, the collar 26 may directly contact and form a seal with the first side 46 of the body 24 as illustrated in FIGS. 3 and 4. Alternatively, as illustrated in FIGS. 13 and 14, at least one seal (e.g., 80, 82) may be included and configured to provide a seal interface between the base 32 and the body 24. The seal (e.g., 80, 82), for example, may be disposed between the base 32 and the body 24 and extend around the lock insert 34 and the aperture 22. In one example, as illustrated in FIG. 13, a ring seal 80 (e.g., a C-seal, a W-seal, an O-ring, etc.) may be seated against or within a channel 84 of the base 32. In another example, as illustrated in FIG. 14, a gasket 82 may be disposed between the base 32 and the body 24. The present disclosure, of course, is not limited to any particular seal types or locations.

While the aperture 22 is shown and described above as having an oval or elliptical cross-sectional geometry, the present disclosure is not limited to such configurations. In alternative embodiments, for example, the aperture 22 may be formed (e.g., cut or cast) into the body 24 with other elongated cross-sectional geometries; e.g., elongated polygonal cross-sectional geometries, etc.

Figure 15:
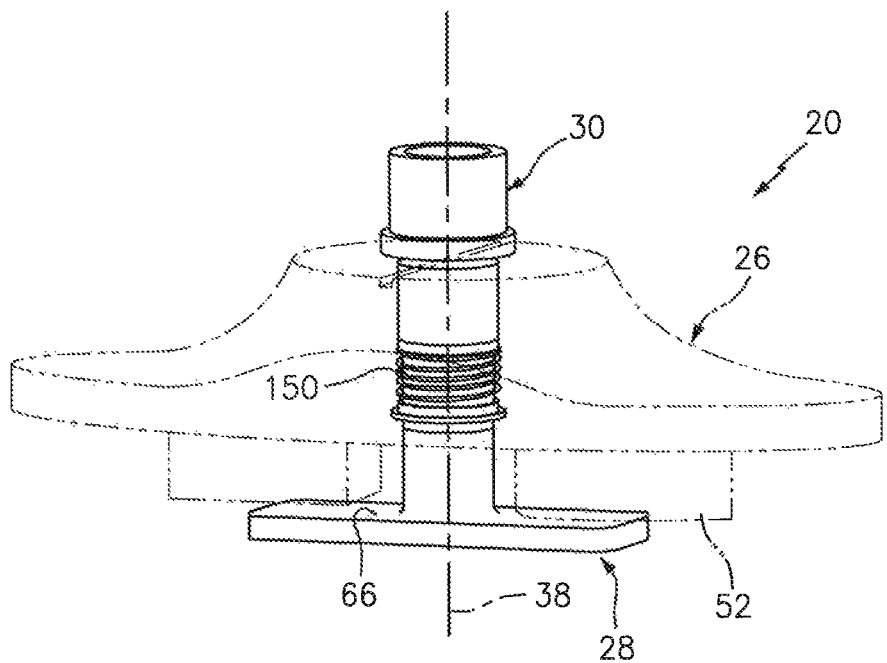
FIGS. 15 and 16 are perspective illustrations of an alternate embodiment plug assembly with a collar, which collar is shown as semi-transparent.
Figure 16:
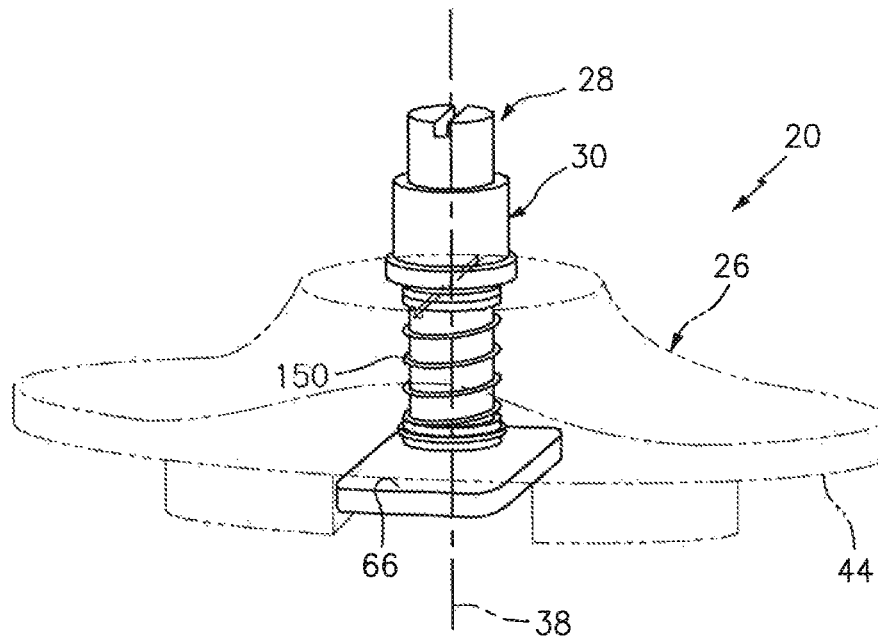
Figure 17:
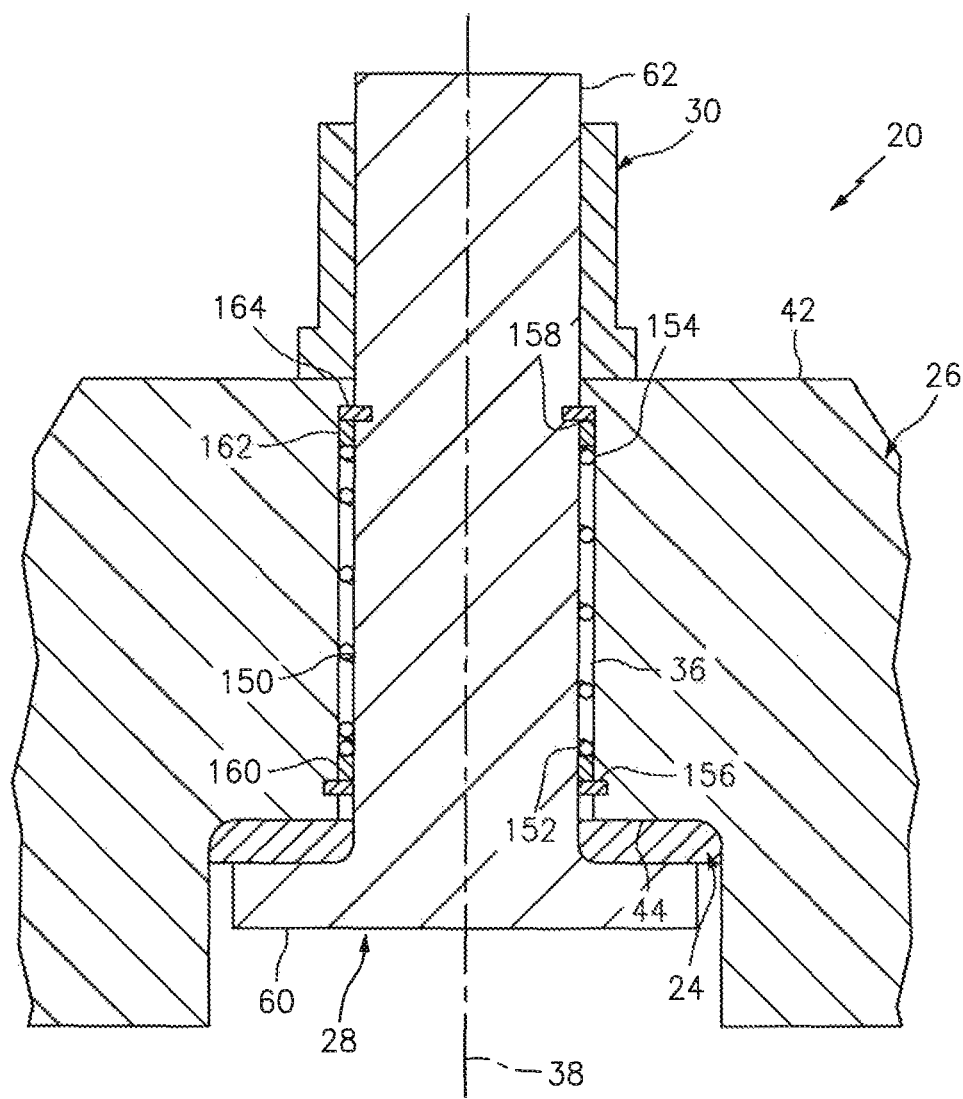
FIG. 17 is a partial sectional illustration of the plug assembly of FIG. 16.

In some embodiments, the plug assembly 20 may include a biasing member 150 as illustrated in FIGS. 15-17. This biasing member 150 may be configured as a coil spring. Alternatively, the biasing member 150 may be configured as an elastomeric sleeve or any other type of resilient biasing device.

As best illustrated in FIG. 17, the biasing member 150 may be mounted on the shaft 62 and disposed within the bore 36 of the collar 26. The biasing member 150 of FIG. 17 extends along the axis 38 between opposing ends 152 and 154. The end 152 is engaged with a shelf 156 (e.g., an annular surface) or rim of the collar 26, and the end 154 is engaged with a shelf 158 (e.g., an annular surface) or rim of the fastener 28, which is axially opposite the shelf 156. The end 152 may engage the shelf 156 through a device 160 such as a washer, bushing and/or seal, or alternatively may be abutted directly against and contact the shelf 156. The end 154 may engage the shelf 158 through a device 162 such as a washer, bushing and/or seal, or alternatively may be abutted directly against and contact the shelf 158.

The shelf 156 may be formed by a retaining device (e.g., a snap ring) mated with or otherwise attached to the base 32 within the bore 36, for example, at the second end surface 44. The shelf 158 may be formed by a retaining device (e.g., a snap ring) mated with or otherwise attached to the shaft 62. This retaining device 158 is configured to move (e.g., slide) along the axis 38 within the bore 36 (see FIGS. 15 and 16), but is axially contained between the shelf 156 and another shelf 164 (e.g., annular surface) or rim of the collar 26, for example, at the first end surface 42.

Figure 18:
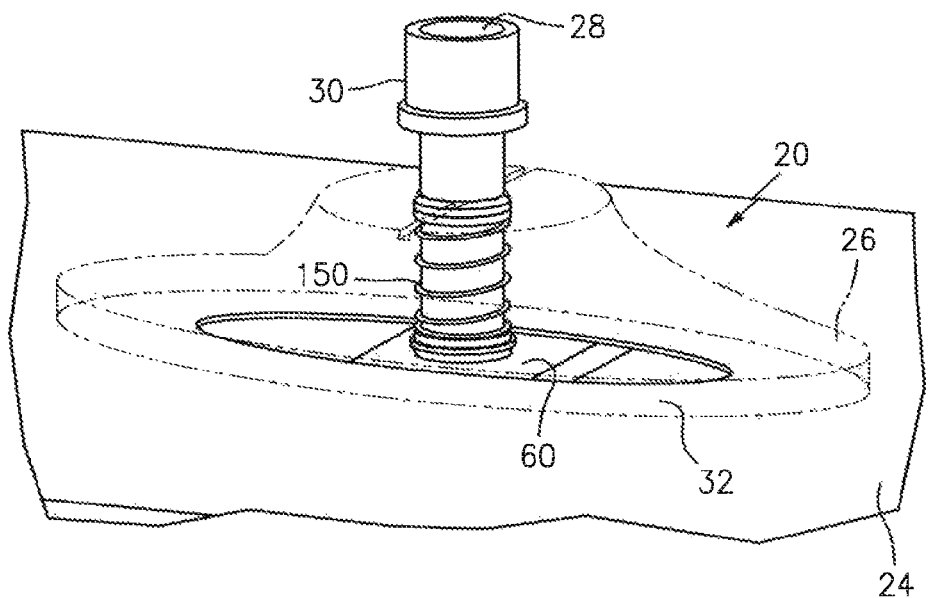
FIGS. 18 and 19 are perspective illustrations of the plug assembly of FIG. 16 arranged with a body, where the collar is shown as semi-transparent.
Figure 19:
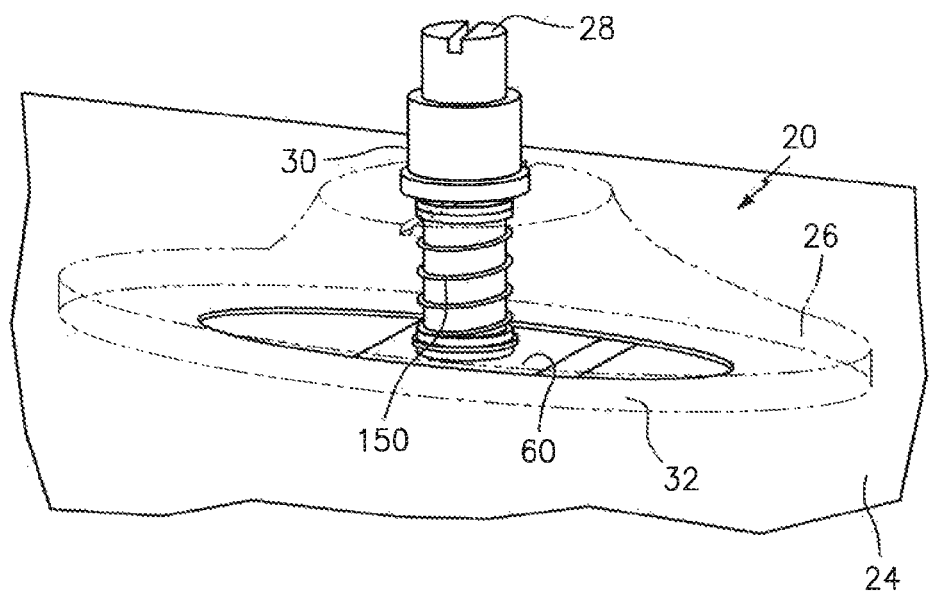

With the foregoing configuration, the biasing member 150 is operable to bias the shelves 156 and 158 axially away from one another and thereby bias the head 60 towards the collar 26. More particularly, where the fastener 28 is in the unlocked and/or installation orientation of FIG. 15, the second end surface 66 is biased towards (or against) the distal end 52. Where the fastener 28 is in the locked and/or installed orientation of FIG. 16, the second end surface 66 is biased towards (or against) the second end surface 44. Such a biasing force may serve to maintain the orientation of FIG. 15 between the fastener 28 and the collar 26 while the plug assembly 20 is being mated with the body 24. The fastener 28 may be clocked clockwise or counterclockwise to the orientation of FIG. 16; see also FIG. 18. The retainer 30 may subsequently be tightened so as to apply an axial clamping force on the body 24 between the base 32 and the head 60 as described above and as shown in FIG. 19.

Figure 20:
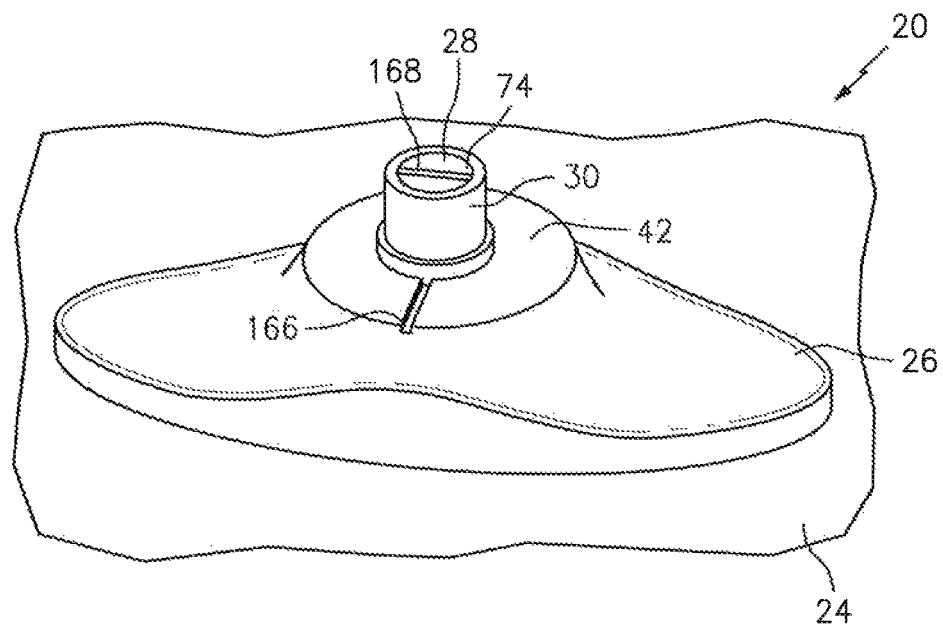
FIGS. 20 and 21 are perspective illustrations of the plug assembly of FIGS. 15 and 16 arranged with a body, where the collar is non-transparent.
Figure 21:
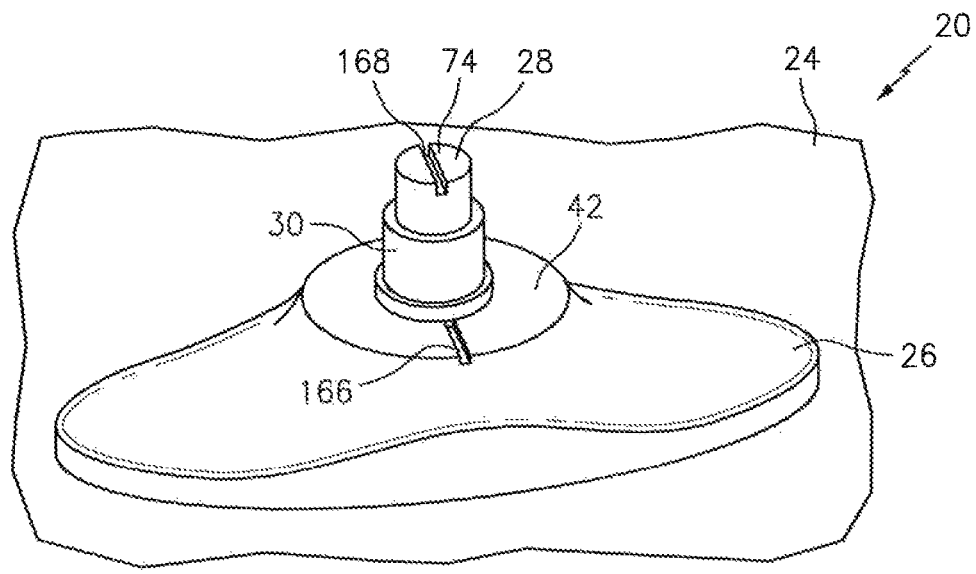

In some embodiments, the plug assembly 20 may include a set of indicators 166 and 168. The indicator 166 may be configured with the collar 26. The indicator 166, for example, may be configured at the first end surface 42 near the bore 36 (see FIG. 17). The indicator 168 may be configured with the fastener 28. The indicator 168, for example, may be configured at the distal end 74. Each of the indicators 166 and 168 may be configured as a slot or any other marking feature such as a protrusion, an ink, paint or other marking, etc. The indicators 166 and 168 are respectively arranged with the collar 26 and the fastener 28 to be misaligned (e.g., perpendicular or otherwise angularly offset) in the unlocked and/or installation orientation of FIG. 20 (see also FIG. 15) and approximately aligned in the locked and/or installed orientation of FIG. 21 (see also FIG. 16). In this manner, the indicators 166 and 168 may provide a visual indication to an installer of whether or not the head 60 has been properly seated between the protrusions 50.

Figure 22:
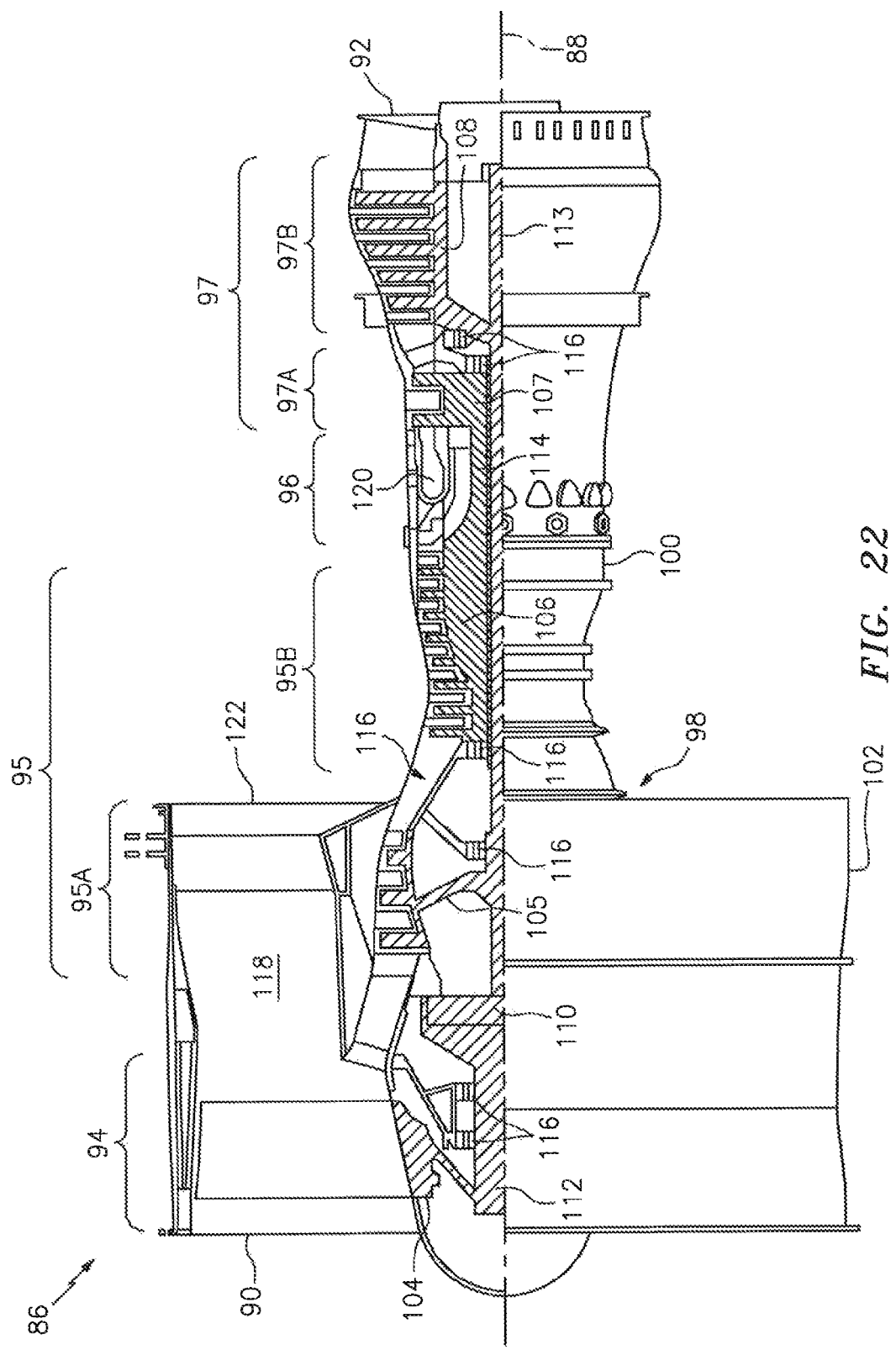
FIG. 22 is a side cutaway illustration of a geared turbine engine with which a plug assembly may be configured.

FIG. 22 is a side cutaway illustration of a geared turbine engine 86 with which the plug assembly 20 and the body 24 may be configured. The turbine engine 86 extends along an axial centerline 88 between an upstream airflow inlet 90 and a downstream airflow exhaust 92. The turbine engine 86 includes a fan section 94, a compressor section 95, a combustor section 96 and a turbine section 97. The compressor section 95 includes a low pressure compressor (LPC) section 95A and a high pressure compressor (HPC) section 95B. The turbine section 97 includes a high pressure turbine (HPT) section 97A and a low pressure turbine (LPT) section 97B.

The engine sections 94-97 are arranged sequentially along the centerline 88 within an engine housing 98. This housing 98 includes an inner case 100 (e.g., a core case) and an outer case 102 (e.g., a fan case). The inner case 100 may house one or more of the engine sections 95-97; e.g., an engine core. The outer case 102 may house at least the fan section 94. The body 24 (see FIGS. 1-4) may be configured as or included in the inner case 100 or the outer case 102, or alternatively any other component included in the turbine engine 86.

Referring still to FIG. 22, each of the engine sections 94, 95A, 95B, 97A and 97B includes a respective rotor 104-108. Each of these rotors 104-108 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 104 is connected to a gear train 110, for example, through a fan shaft 112. The gear train 110 and the LPC rotor 105 are connected to and driven by the LPT rotor 108 through a low speed shaft 113. The HPC rotor 106 is connected to and driven by the HPT rotor 107 through a high speed shaft 114. The shafts 112-114 are rotatably supported by a plurality of bearings 116; e.g., rolling element and/or thrust bearings. Each of these bearings 116 is connected to the engine housing 98 (e.g., the inner case 100) by at least one stationary structure such as, for example, an annular support strut.

During operation, air enters the turbine engine 86 through the airflow inlet 90, and is directed through the fan section 94 and into a core gas path 116 and the bypass gas path 118. The air within the core gas path 116 may be referred to as "core air". The air within the bypass gas path 118 may be referred to as "bypass air". The core air is directed through the engine sections 95-97, and exits the turbine engine 86 through the airflow exhaust 92 to provide forward engine thrust. Within the combustor section 96, fuel is injected into a combustion chamber 120 and mixed with the core air. This fuel-core air mixture is ignited to power the turbine engine 86. The bypass air is directed through the bypass gas path 118 and out of the turbine engine 86 through a bypass nozzle 122 to provide additional forward engine thrust. Alternatively, at least some of the bypass air may be directed out of the turbine engine 86 through a thrust reverser to provide reverse engine thrust.

The plug assembly 20 may be included in various turbine engines other than the one described above as well as in other types of rotational and non-rotational equipment. The plug assembly 20, for example, may be included in a geared turbine engine where a gear train connects one or more shafts to one or more rotors in a fan section, a compressor section and/or any other engine section. Alternatively, the plug assembly 20 may be included in a turbine engine configured without a gear train. The plug assembly 20 may be included in a geared or non-geared turbine engine configured with a single spool, with two spools (e.g., see FIG. 22), or with more than two spools. The turbine engine may be configured as a turbofan engine, a turbojet engine, a propfan engine, or any other type of turbine engine. The present invention therefore is not limited to any particular types or configurations of turbine engines or equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus, comprising:
   a body extending between first and second sides;
   a collar sealingly engaging the first side and extending into an aperture in the body, wherein the aperture extends along an axis through the body between the first side and the second side, and the axis is acute to the first side and/or the second side;

a fastener engaging the second side and extending through the collar to a distal end; and a retainer mated with the fastener at the distal end;

wherein the collar and the fastener cooperate to limit rotation therebetween.

2. The apparatus of claim 1, wherein the body and the collar cooperate to limit rotation therebetween.

3. The apparatus of claim 1, wherein the collar, the fastener and the retainer are operable to be assembled together with the body without having access to the second side of the body.

4. The apparatus of claim 1, wherein a head of the fastener is configured to pass through the aperture where the head has a first orientation, and the head is configured to engage the second side where the head has a second orientation.

5. The apparatus of claim 4, wherein
the collar includes a first indicator;
the fastener includes a second indicator; and
the first and the second indicators are substantially aligned in the second orientation and the first and the second indicators are misaligned in the first orientation.

6. The apparatus of claim 1, wherein
the aperture has a cross-sectional geometry; and
a head of the fastener engaging the second side has a cross-sectional geometry sized and shaped to
fit within the cross-sectional geometry of the aperture in a first orientation; and
overlap the cross-sectional geometry of the aperture in a second orientation.

7. The apparatus of claim 6, wherein
the aperture has a cross-sectional geometry with a length and a width; and
a head of the fastener engaging the second side has a cross-sectional geometry with a length greater than the width of the aperture and less than the length of the aperture.

8. The apparatus of claim 1, wherein
the collar includes a protrusion;
the fastener includes a head engaging the second side; and
the protrusion and the head are configured to laterally engage one another and thereby limit rotation between the collar and the fastener.

9. The apparatus of claim 8, wherein the protrusion includes a planar surface that contacts a planar surface of the head and thereby limits rotation between the collar and the fastener.

10. The apparatus of claim 8, wherein
the collar further includes a second protrusion; and
the head is positioned between the protrusion and the second protrusion.

11. The apparatus of claim 8, wherein the body and the protrusion are configured to limit rotation between the body and the collar.

12. The apparatus of claim 11, wherein the body includes an aperture surface at least partially forming the aperture, and the protrusion includes a surface that substantially conforms to the aperture surface and thereby limits rotation between the body and the collar.

13. The apparatus of claim 1, further comprising a biasing member configured to bias a head of the fastener towards the collar.

14. The apparatus of claim 13, wherein the biasing member is within a bore of the collar between a shelf of the collar and a shelf of the fastener.

15. The assembly of claim 1, wherein the body comprises a component of a turbine engine.

16. The apparatus of claim 1, wherein the collar is a monolithic body.

17. An apparatus, comprising:
a body extending between opposing first and second sides;
a collar sealingly engaging the first side and extending into an aperture in the body, wherein the collar is configured as a unitary body;
a fastener including a head and a shaft, wherein the head is configured to pass through the aperture during a first step and the head is configured to engage the second side during a second step, and wherein the shaft is configured to extend through the collar to a distal end; and
a nut threaded onto the shaft at the distal end.

18. An assembly for plugging an aperture in a body, the assembly comprising:
a collar including a base and a protrusion, the base configured to sealingly engage a first side of the body, and the protrusion configured to extend axially into the aperture, wherein the collar is configured as a unitary body;
a fastener including a head and a shaft, the head configured to engage a second side of the body opposite the first side, and the shaft configured to extend axially away from the head, through the collar, to a distal end; and
a retainer configured to mate with the shaft at the distal end;
wherein the head is configured to engage the protrusion and thereby limit rotation between the collar and the fastener.

19. The assembly of claim 18, wherein
the protrusion comprises a first protrusion, and the collar includes a second protrusion configured to extend axially into the aperture; and
the head is configured to nest between the first and the second protrusions.

20. The assembly of claim 18, further comprising a seal configured to extend around the protrusion and provide a seal interface between the base and the first side of the body.

* * * * *